US008630778B2

(12) United States Patent
Hopp

(10) Patent No.: US 8,630,778 B2
(45) Date of Patent: Jan. 14, 2014

(54) CONTROLLING A THROTTLE FOR FUEL CUT ACQUISITION

(75) Inventor: Chris Hopp, Raymond, OH (US)

(73) Assignee: Honda Motor Co., Ltd., Tokyo (JP)

( * ) Notice: Subject to any disclaimer, the term of this patent is extended or adjusted under 35 U.S.C. 154(b) by 1180 days.

(21) Appl. No.: 12/537,783

(22) Filed: Aug. 7, 2009

(65) Prior Publication Data

US 2010/0036574 A1 Feb. 11, 2010

Related U.S. Application Data

(60) Provisional application No. 61/087,414, filed on Aug. 8, 2008.

(51) Int. Cl.
*B60W 10/00* (2006.01)

(52) U.S. Cl.
USPC ............... 701/68; 701/36; 701/51; 701/54; 701/56; 701/67; 701/70; 476/1; 477/34; 477/43; 477/70; 477/77; 477/78; 477/79; 477/80; 477/86; 477/90; 477/91; 477/107; 477/115; 477/166

(58) Field of Classification Search
None
See application file for complete search history.

(56) References Cited

U.S. PATENT DOCUMENTS

| | | | | |
|---|---|---|---|---|
| 4,495,576 A | * | 1/1985 | Ito | 701/66 |
| 4,618,041 A | * | 10/1986 | Sotoyama et al. | 477/62 |
| 5,045,035 A | | 9/1991 | Ganoung | |
| 5,141,089 A | * | 8/1992 | Nobumoto et al. | 477/169 |
| 5,267,158 A | * | 11/1993 | Sakaguchi et al. | 701/68 |
| 5,637,052 A | * | 6/1997 | Hirota et al. | 477/61 |
| 5,722,912 A | * | 3/1998 | Narita | 477/64 |
| 5,795,266 A | * | 8/1998 | Hasegawa et al. | 477/169 |
| 5,807,209 A | * | 9/1998 | Matsubara et al. | 477/176 |
| 5,853,350 A | * | 12/1998 | Hasegawa et al. | 477/166 |
| 5,879,266 A | * | 3/1999 | Sawamura et al. | 477/62 |
| 6,050,919 A | * | 4/2000 | Kusafuka et al. | 477/176 |
| 6,056,667 A | * | 5/2000 | Sasaki | 477/174 |
| 6,132,336 A | * | 10/2000 | Adachi et al. | 477/169 |
| 6,709,364 B2 | * | 3/2004 | Eguchi et al. | 477/174 |
| 6,860,833 B2 | * | 3/2005 | Ayabe | 477/121 |
| 7,252,620 B2 | * | 8/2007 | Kiuchi | 477/62 |
| 2002/0052265 A1 | * | 5/2002 | Segawa et al. | 477/62 |
| 2002/0077218 A1 | * | 6/2002 | Segawa et al. | 477/176 |
| 2003/0109357 A1 | * | 6/2003 | Tabata | 477/109 |
| 2004/0018913 A1 | * | 1/2004 | Okamoto et al. | 477/62 |
| 2004/0078130 A1 | * | 4/2004 | Segawa et al. | 701/67 |
| 2004/0111203 A1 | * | 6/2004 | Higashimata et al. | 701/51 |
| 2005/0001480 A1 | * | 1/2005 | Tabata et al. | 303/141 |
| 2005/0101434 A1 | * | 5/2005 | Segawa et al. | 477/70 |
| 2006/0122755 A1 | * | 6/2006 | Segawa et al. | 701/67 |

(Continued)

FOREIGN PATENT DOCUMENTS

JP 20033262148 9/2003
JP 2004322856 11/2004

*Primary Examiner* — Thomas Tarcza
*Assistant Examiner* — Jonathan M Dager
(74) *Attorney, Agent, or Firm* — Plumsea Law Group, LLC; Mark E. Duell

(57) ABSTRACT

A system and method for determining a required throttle position and operating a throttle in the required throttle position to attain a required engine speed for fuel cut acquisition is disclosed. A lock-up clutch may be engaged without a shock if a required engine speed is achieved that corresponds to a current transmission speed. Fuel economy may be increased by cutting fuel to the engine when a lock-up clutch is engaged.

20 Claims, 6 Drawing Sheets

(56) References Cited

U.S. PATENT DOCUMENTS

| | | |
|---|---|---|
| 2006/0149433 A1* | 7/2006 | Otsubo et al. .................. 701/29 |
| 2007/0005211 A1* | 1/2007 | Katsumata et al. ............. 701/67 |
| 2007/0213175 A1* | 9/2007 | Kuwahara et al. ............. 477/62 |
| 2007/0287594 A1* | 12/2007 | DeGeorge et al. ............ 477/176 |
| 2009/0076689 A1* | 3/2009 | Dickinson et al. .............. 701/51 |
| 2009/0099741 A1* | 4/2009 | Hopp .............................. 701/54 |
| 2009/0280950 A1* | 11/2009 | Michishita et al. ............... 477/3 |
| 2010/0057310 A1* | 3/2010 | Hopp .............................. 701/54 |
| 2013/0109535 A1* | 5/2013 | Dickinson et al. ............ 477/174 |

\* cited by examiner ated to a lock-up controller for an automatic transmission. Inokuchi teaches a method to provide a lock-up controller capable of directly coupling a lock-up clutch, while suppressing shocks, even during deceleration of a vehicle.

CONTROLLING A THROTTLE FOR FUEL CUT ACQUISITION

CROSS-REFERENCE TO RELATED APPLICATION

This application claims priority under 35 U.S.C. §119(e) to U.S. Provisional Patent Application No. 61/087,414, entitled "Controlling a Throttle for Fuel Cut Acquisition", and filed on Aug. 8, 2008, which application is hereby incorporated by reference.

BACKGROUND

The present invention relates to motor vehicles and in particular to a motor vehicle with a lock-up clutch.

Motor vehicles with provisions for extending fuel cut time have been previously proposed. Ganoung (U.S. Pat. No. 5,045,035) is directed to a high-efficiency powertrain. Ganoung teaches a system that includes a high specific output engine coupled to an automatic transmission which, is expanded from four to five forward speed ratios by a novel two-speed torque converter assembly within the transmission. Ganoung teaches this system to exploit the fuel economy potential of modern high specific output engines and more effectively manage the characteristically peaky torque curve of such engines.

Ganoung teaches a lock-up clutch for directly connecting the engine and the transmission in some situations. Ganoung discusses the use of the drive-by-wire control unit to enhance control of the lock-up clutch. In particular, Ganoung teaches that by using the drive-by-wire control unit, the throttle can be prevented from opening immediately following the depression of the accelerator just after the lock-up clutch has been disengaged. This allows a delay during which a smooth reengagement of the clutch can be completed at a fast-idle position of the throttle.

Inokuchi (Japanese Patent Number 2004-322856) is directed to a lock-up controller for an automatic transmission. Inokuchi teaches a method to provide a lock-up controller capable of directly coupling a lock-up clutch, while suppressing shocks, even during deceleration of a vehicle.

Inokuchi teaches an automatic transmission connected with an engine through a torque converter. Inokuchi teaches that when deceleration of a vehicle is started with the torque converter in a non-direct coupling state, the lock-up clutch is changed to a direct coupling state following a shift by the automatic transmission control unit. At the same time, the engine control unit controls the throttle opening so that the throttle opening is reduced at a predetermined rate of change. In particular, the throttle opening is initially open to some finite value and is controlled in a manner that decreases this value over time. This arrangement prevents a sudden reduction of engine speed to allow time for direct coupling of the torque converter to be completed.

The methods of the prior art require time for the engine speed to be iteratively increased or decreased until the desired speed is found for smoothly engaging the lock-up clutch. There is a need in the art for a system and method that addresses this shortcoming, including a system and method for decreasing the amount of time required to reengage the lock-up clutch following a change in the transmission.

SUMMARY OF THE INVENTION

A system and method for determining a throttle position and controlling a throttle to engage a lock-up clutch for fuel cut acquisition is disclosed. Generally, these methods can be used in connection with an engine of a motor vehicle. The term "motor vehicle" as used throughout the specification and claims refers to any moving vehicle that is capable of carrying one or more human occupants and is powered by any form of energy. The term motor vehicle includes, but is not limited to cars, trucks, vans, minivans, SUVs, motorcycles, scooters, boats, personal watercraft, and aircraft.

In some cases, the motor vehicle includes one or more engines. The term "engine" as used throughout the specification and claims refers to any device or machine that is capable of converting energy. In some cases, potential energy is converted to kinetic energy. For example, energy conversion can include a situation where the chemical potential energy of a fuel or fuel cell is converted into rotational kinetic energy or where electrical potential energy is converted into rotational kinetic energy. Engines can also include provisions for converting kinetic energy into potential energy. For example, some engines include regenerative braking systems where kinetic energy from a drivetrain is converted into potential energy. Engines can also include devices that convert solar or nuclear energy into another form of energy. Some examples of engines include, but are not limited to: internal combustion engines, electric motors, solar energy converters, turbines, nuclear power plants, and hybrid systems that combine two or more different types of energy conversion processes.

In one aspect, the invention provides a method of operating a motor vehicle, comprising the steps of: receiving a current transmission speed; determining a required engine speed according to the current transmission speed; determining a required throttle position according to the required engine speed; opening a throttle according to the required throttle position; and achieving the required engine speed and engaging a lock-up clutch.

In another aspect, the step of determining a required throttle position includes a step of retrieving a map of required throttle positions as a function of required engine speeds.

In another aspect, the map is a mathematical relationship.

In another aspect, the map is a lookup table.

In another aspect, the throttle is opened to the required throttle position substantially immediately.

In another aspect, the step of engaging the lock-up clutch is followed by a step of reengaging a fuel cut.

In another aspect, the current transmission speed is received from a sensor configured to determine transmission speed.

In another aspect, the throttle is opened using a drive-by-wire system.

In another aspect, the invention provides a method of operating a motor vehicle, comprising the steps of: determining a relationship between throttle position and engine speed for an engine experiencing a predetermined level of torque; creating a map that receives an engine speed as an input and outputs a throttle position; and allowing an electronic control unit of the motor vehicle to access the map and compute a required throttle position based on a required engine speed.

In another aspect, the map is a mathematical relationship.

In another aspect, the map is a lookup table.

In another aspect, the relationship between throttle position and engine speed is determined for an engine experiencing zero torque.

In another aspect, the invention provides a method of operating a motor vehicle, comprising the steps of: operating a throttle in a first throttle position while a lock-up clutch is disengaged; determining a second throttle position that is substantially greater than the closed throttle position; changing the throttle from the first throttle position to the second throttle position, the change occurring substantially immediately; and thereby allowing the lock-up clutch to engage.

In another aspect, the second throttle position is a required throttle position.

In another aspect, the step of determining the second throttle position includes a step of determining a required engine speed.

In another aspect, the step of allowing the lock-up clutch to engage is followed by a step of engaging a fuel cut.

In another aspect, the step of allowing the lock-up clutch to engage is followed by a step of closing the throttle.

In another aspect, the throttle is controlled independently of a throttle pedal.

In another aspect, the lock-up clutch is disengaged following an upshift.

In another aspect, the lock-up clutch is disengaged following a downshift.

Other systems, methods, features and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

Figure 1:
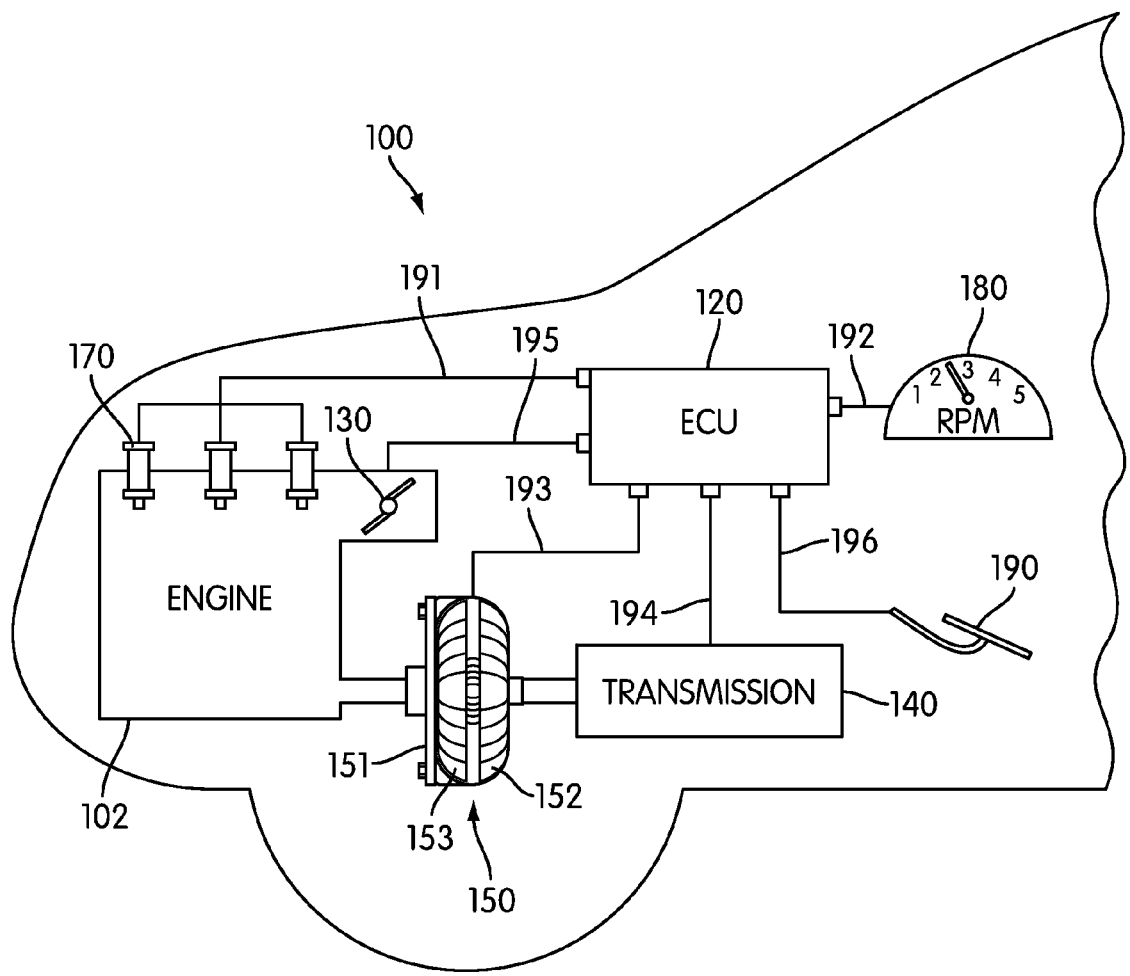
FIG. 1 is a schematic view of an embodiment of a portion of a motor vehicle.

FIG. 1 is a schematic view of an embodiment of a portion of motor vehicle 100. For purposes of illustration, motor vehicle 100 is shown as a sports utility vehicle; however it should be understood that in other embodiments motor vehicle 100 could be any type of motor vehicle including, but not limited to, cars, trucks, vans, minivans, SUVs, motorcycles, scooters, boats, personal watercraft, and aircraft.

Motor vehicle 100 may include engine 102. Engine 102 may be any type of engine that is capable of producing torque. In addition, motor vehicle 100 and engine 102 may be associated with other components that can assist in propelling motor vehicle 100. For clarity, only some components of motor vehicle 100 are shown in this schematic illustration. It should be understood that in other embodiments, additional components may be used with motor vehicle 100.

Engine 102 may be associated with one or more fuel injectors that are configured to deliver fuel to engine 102. In this embodiment, engine 102 may include fuel injector set 170 that comprises three fuel injectors. In other embodiments, more or less than three fuel injectors may be associated with engine 102. Each fuel injector comprising fuel injector set 170 may be associated with, and configured to deliver fuel to, a cylinder within engine 102.

Engine 102 may also be associated with throttle 130. Throttle 130 may be configured to regulate the amount of air entering engine 102. In some cases, throttle 130 may be associated with an intake manifold of engine 102. By opening to various throttle positions, throttle 130 may control the amount of air entering engine 102 and thereby control the speed of engine 102. Throttle 130 may be further associated with throttle pedal 190. Using this arrangement, a driver of motor vehicle 100 may depress throttle pedal 190 to direct throttle 130 to open and allow air to enter engine 102.

In some embodiments, motor vehicle 100 includes transmission 140. In an embodiment, transmission 140 is an automatic transmission. Transmission 140 may be any type of automatic transmission that is known in the art, including any type of hydraulic automatic transmission, manually controlled automatic transmission as well as electronically controlled transmissions.

In some embodiments, transmission 140 is coupled with engine 102 via torque converter 150. Torque converter 150 may be configured to transfer rotating power between engine 102 and transmission 140 through a fluid coupling. In this embodiment, torque converter 150 may comprise pump 152 and turbine 153 that are disposed within a fluid. The fluid may be a transmission fluid. Pump 152 may be associated with, and connected directly to, engine 102, while turbine 153 may be associated with, and connected directly to, transmission 140.

For clarity, only some components of torque converter 150 are shown in this schematic illustration. However, it should be understood that torque converter 150 may comprise additional components as well, including, but not limited to, a stator, a flywheel, a turbine output shaft and a stator output shaft. Generally, any type of torque converter known in the art may be used.

In some embodiments, torque converter 150 includes provisions for reducing viscous losses to improve efficiency and reduce waste heat. At high speeds the fluid coupling of pump 152 and turbine 153 causes turbine 153 to move at a slightly slower speed than pump 152, which results in slippage. In some embodiments, torque converter 150 may create a solid connection between engine 102 and transmission 140 using lock-up clutch 151. With lock-up clutch 151 engaged, the engine speed may be lowered while maintaining a given vehicle speed, which may increase fuel economy. This feature will be discussed in more detail later.

In some embodiments, motor vehicle 100 includes provisions for communicating, and in some cases controlling, the various components associated with motor vehicle 100. In some embodiments, motor vehicle 100 may be associated with a computer or similar device. In the current embodiment, motor vehicle 100 may be associated with electronic control unit 120, hereby referred to as ECU 120. In an embodiment, ECU 120 may be configured to communicate with, and/or control, engine 102 as well as additional components of motor vehicle 100 not associated with engine 102.

In the current embodiment, ECU 120 may be configured to communicate with components of engine 102. In some embodiments, ECU 120 may communicate and control fuel injector set 170 via first circuit 191. In particular, ECU 120 may initiate and terminate fuel cuts with fuel injector set 170 via first circuit 191. Likewise, ECU 120 may communicate with engine speed sensor 180, configured to measure a current engine speed, via second circuit 192. In particular, ECU 120 may be configured to receive information gathered by engine speed sensor 180 using second circuit 192. For purposes of illustration, engine speed sensor 180 is shown in FIG. 1 as a tachometer, however it should be understood that engine speed sensor 180 may be associated directly with one or more portions of engine 102. In some cases, for example, engine speed sensor 180 could be a crank angle sensor.

In the current embodiment, ECU 120 may also be configured to communicate with components of motor vehicle 100 associated with a powertrain. In some embodiments, ECU 120 may communicate with torque converter 150 via third circuit 193. Furthermore, ECU 120 may communicate with transmission 140 via fourth circuit 194. In some cases, ECU 120 may receive information regarding parameters of transmission 140, including current transmission speed via fourth circuit 194.

In some embodiments, throttle 130 may be mechanically linked to throttle pedal 190. In an embodiment, ECU 120 may also include provisions for electronically controlling throttle 130. In particular, ECU 120 may communicate and control throttle 130 via fifth circuit 195. Additionally, ECU 120 may communicate with throttle pedal 190 via sixth circuit 196 and receive information related to the position of throttle pedal 190. With this arrangement, ECU 120 may direct throttle 130 to open and close to various throttle positions via fifth circuit 195 according to various parameters, including the position of throttle pedal 190. In some cases, this arrangement may be known as a "drive-by-wire" system.

Circuits 191-196 may comprise one or more connections. In some cases, the connections could be electrical wires or printed circuits. In other cases, the connections could be wireless connections of some kind. In still other cases, the connections could include both electrical wires and wireless connections.

Generally, ECU 120 may be configured to communicate with additional components of engine 102 not shown in the Figures. In other embodiments, multiple electronic control units may be used. In these other embodiments, each control unit may be associated with one or more components and in communication with one another.

Throughout the following embodiments it should be understood that ECU 120 may include provisions for determining a current transmission speed. Methods for determining the speed of a transmission, including one or more components of the transmission, are known in the art. In some cases, the transmission speed may be determined using a sensor associated with one or more parts of the transmission. In other cases, transmission 140 may communicate information related to a current speed directly to ECU 120 via fourth circuit 194.

Typically, ECU 120 is configured to monitor multiple parameters associated with engine 102 to ensure the efficient use of fuel. In particular, in some driving situations, lock-up clutch 151 may be engaged to reduce viscous losses in torque converter 150 and lower the engine speed to increase fuel economy. In other driving situations, decel lock-up control may be engaged and lock-up clutch 151 may be used to keep engine 102 running without fuel when a motor vehicle 100 is moving. In these situations, the momentum of motor vehicle 100 drives the wheels and can be transmitted back to engine 102 when lock-up clutch 151 is engaged. The term "decel lock-up control", as used throughout this detailed description and in the claims, refers to a driving situation with a lock-up clutch engaged and fuel cut activated. During decel lock-up control, fuel consumption can be reduced since the lock-up clutch is engaged to supply rotational power to an engine from the momentum of the motor vehicle.

Typically, decel lock-up control must be deactivated during upshifting or downshifting of a transmission, to avoid shocks associated with an engaged lock-up clutch during these shifting events. Furthermore, following either a downshift or an upshift, the difference between the engine speed and the transmission speed may be large enough to prevent reactivation of decel lock-up control. These situations may decrease the fuel efficiency of the motor vehicle.

In some embodiments, a motor vehicle includes provisions for facilitating reactivation of decel lock-up control immediately following a change in the state of the transmission, including a downshift or an upshift. In some embodiments, ECU 120 may be configured to control engine 102 to achieve a required engine speed necessary to reengage decel lock-up control. The term "required engine speed", as used throughout this detailed description and in the claims, refers to an engine speed that matches the current transmission speed. In an embodiment, ECU 120 may automatically control throttle 130 using a drive-by-wire system to open in order to achieve a required engine speed. In particular, ECU 120 may control throttle 130 to immediately open to a required throttle position. The term "required throttle position", as used throughout this detailed description and in the claims, refers to a throttle position that achieves the required engine speed necessary to match a current transmission speed. Once the engine speed and the transmission speed are substantially equal, decel lock-up control can be reengaged.

Figure 9:
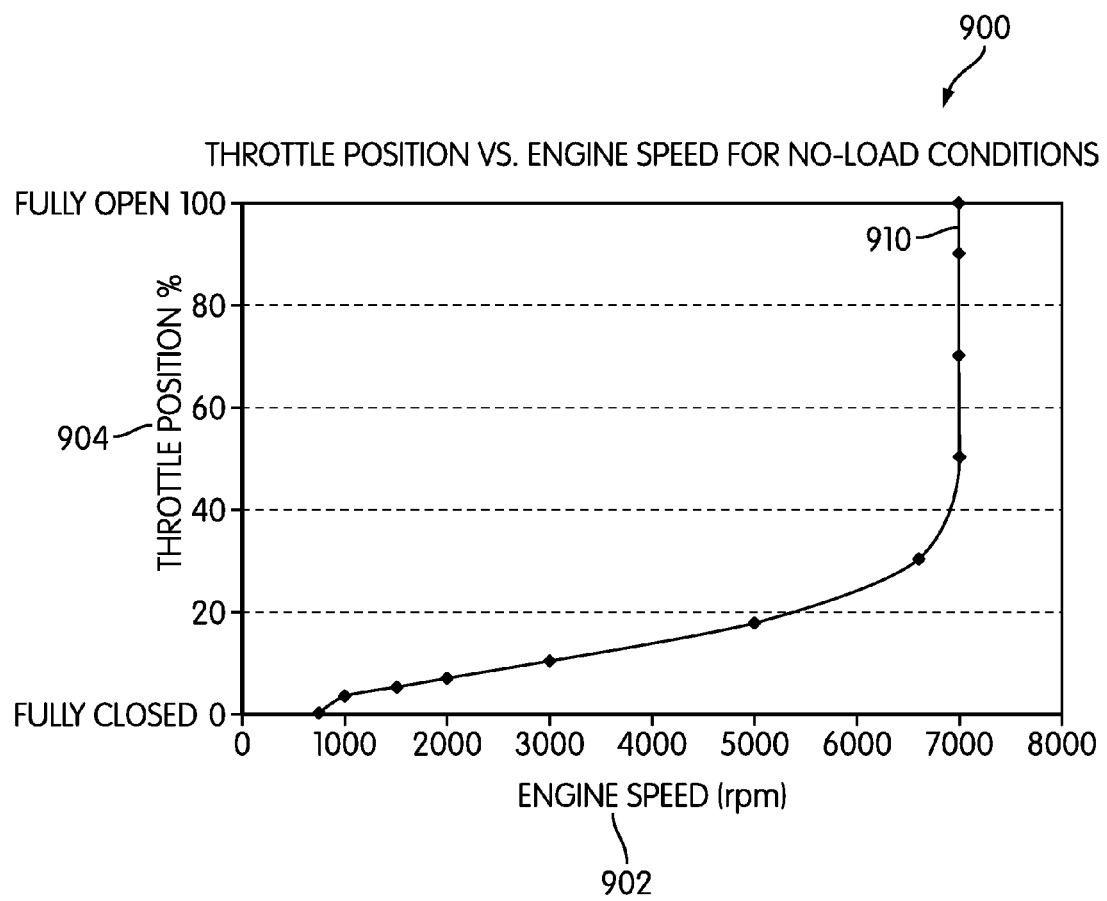
FIG. 9 is an embodiment of a map configured to relate throttle positions to engine speeds to achieve zero torque engine conditions under no-load conditions.

In some embodiments, ECU 120 includes provisions for selecting a required throttle position necessary to achieve a required engine speed. In some cases, ECU 120 may include a map, table, mathematical function or another provision for determining required throttle positions as a function of required engine speeds. Details of these provisions are discussed below and an example is illustrated in FIG. 9. In prior methods, a throttle may be automatically controlled in a manner that allows the engine speed to be adjusted slowly until the lock-up clutch can be smoothly engaged. Such processes are iterative, and require extended time for "seeking" out an engine speed that may be useful for reengaging the lock-up clutch. In contrast, the current method automatically selects a required throttle position that is necessary to achieve a required engine speed for reengaging decel lock-up control immediately following a change in the state of the transmission. In particular, the current method may provide advantages over previous methods by decreasing the time that decel lock-up control is disengaged and therefore increasing the fuel efficiency of the motor vehicle.

FIGS. 2-5 illustrate an embodiment of a situation when a throttle is opened to a required throttle position by drive-by-wire so that decel lock-up control may be engaged. In these Figures, driver 204 is not depressing throttle pedal 190. In other embodiments, a driver may depress a throttle pedal to a small angle while a throttle is opened to a required throttle position through drive-by-wire.

Figure 2:
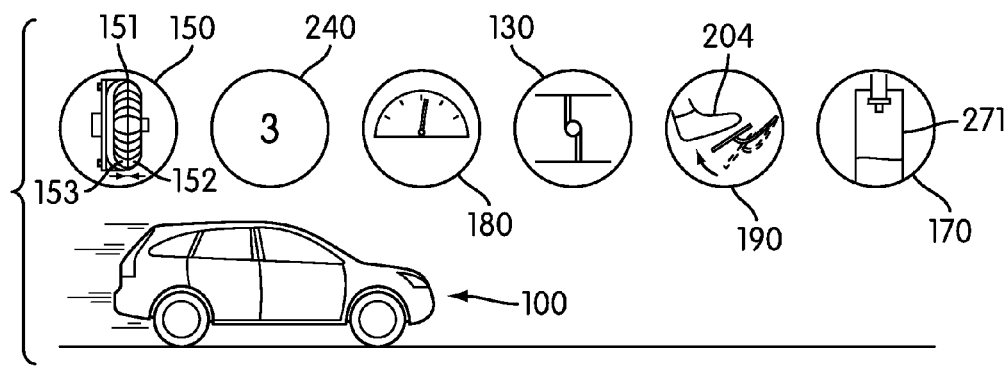
FIG. 2 is a schematic side view of an embodiment of a motor vehicle with a lock-up clutch engaged and a fuel cut activated.

Referring to FIG. 2, motor vehicle 100 may be operating with decel lock-up control activated. Specifically, lock-up clutch 151 is engaged so that rotational power is provided to engine 102 (see FIG. 1) through the physical connection between turbine 153 and pump 152. Also, fuel injector set 170, illustrated in FIGS. 2-5 as a single fuel injector is not injecting fuel into cylinder 271. Additionally, throttle 130 is in a first throttle position that is a fully closed position. In this embodiment, the engine speed is at a particular value, such as approximately 3000 RPM, for example, as indicated by engine speed sensor 180. Also, transmission mode 240 is set to third gear. The term "transmission mode", as used throughout this detailed description and in the claims, refers to a particular gear ratio.

Figure 3:
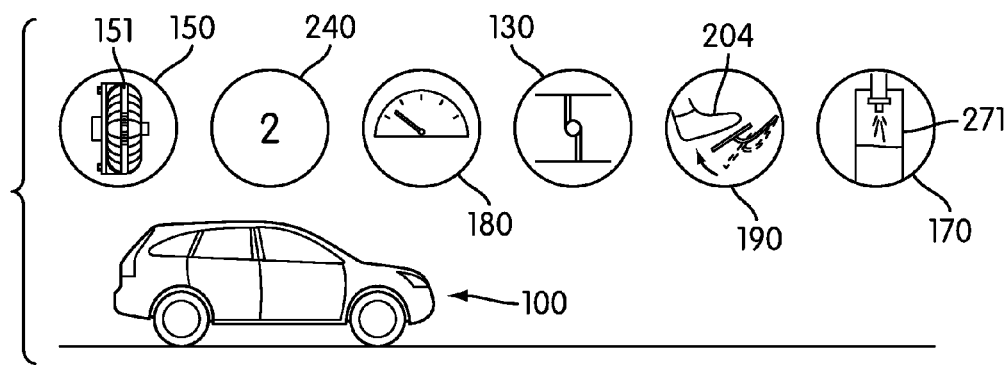
FIG. 3 is a schematic side view of an embodiment of a motor vehicle with a lock-up clutch disengaged and a fuel injector injecting fuel.

Referring to FIG. 3, decel lock-up control is deactivated to accommodate a downshift. In particular, lock-up clutch 151 is disengaged and fuel injector set 170 resumes injecting fuel into cylinder 271. With the downshift, transmission mode 240 changes to second gear and engine speed sensor 180 registers a decrease in engine speed. The engine speed of motor vehicle 100 may be, for example, approximately 1500 RPM. Throttle 130 remains in a first throttle position that is a fully closed position.

The amount of fuel cut time may be extended by applying decel lock-up control after the gear shift. However, the different values of engine speed and current transmission speed may cause a shock if lock-up clutch 151 is engaged. In some embodiments, the engine speed may be increased to a required engine speed by opening throttle 130 to a required throttle position.

Figure 4:
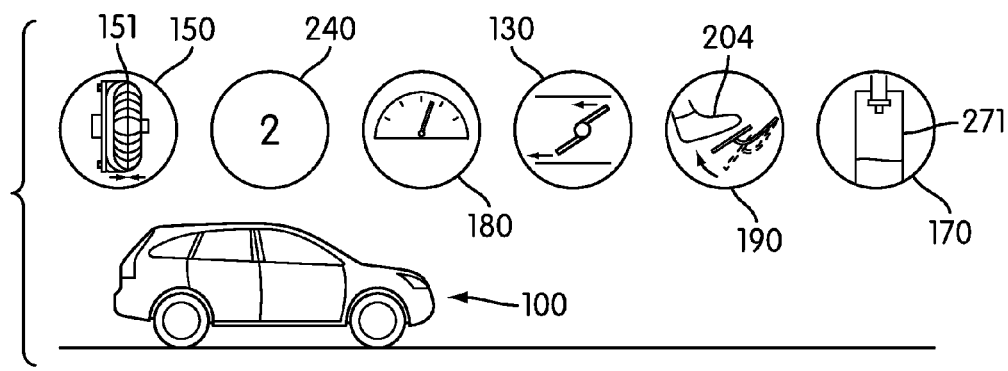
FIG. 4 is a schematic side view of an embodiment of a motor vehicle with a throttle partially opened and a lock-up clutch engaged.

Referring to FIG. 4, throttle 130 is opened via drive-by-wire to a second throttle position. The second throttle position is substantially greater than the first throttle position and is a partially opened position of throttle 130. In some embodiments, the change of throttle 130 to a second throttle position occurs substantially immediately. With throttle 130 opened to the second throttle position, the engine speed may increase. In this embodiment, engine speed sensor 180 indicates an increase in engine speed to approximately 3500 RPM, for example. This increase in engine speed may reduce the difference between engine speed and current transmission speed. With this configuration, decel lock-up control may be activated by engaging lock-up clutch 151 and cutting fuel from fuel injector set 170 to cylinder 271 to extend fuel cut time.

Figure 5:
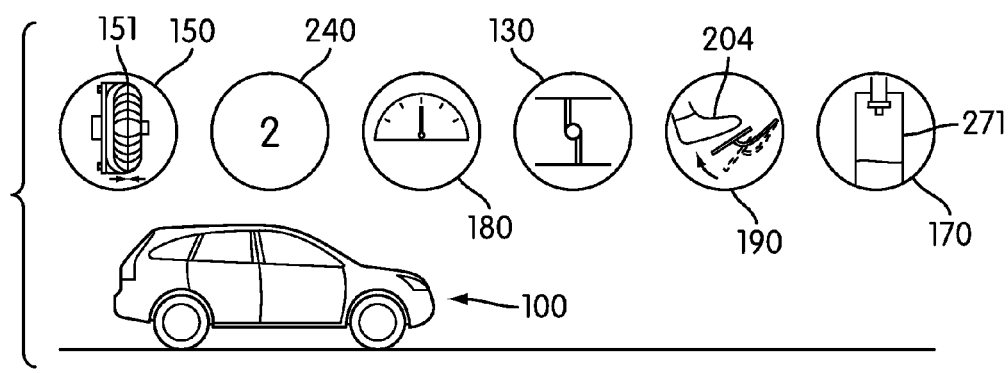
FIG. 5 is a schematic side view of an embodiment of a motor vehicle with a throttle closed and decel lock-up control activated.

With lock-up clutch 151 engaged, throttle 130 is closed to eliminate engine idling as seen in FIG. 5. In this embodiment, transmission mode 240 remains in second gear and engine speed sensor 180 shows a slight decrease in engine speed. For example, engine speed may now be approximately 3000 RPM. At this point, the fuel cut continues and fuel injector set 170 remains inactive as long as lock-up clutch 151 is engaged.

By adjusting a throttle through drive-by-wire to substantially increase the engine speed to the current transmission speed, decel lock-up control may be engaged. Using this arrangement, fuel economy may be increased as fuel is cut to the engine. Furthermore, the engine does not stall because rotational power is transferred from the transmission to the engine. When a driver resumes acceleration, decel lock-up control may be disengaged and fuel injection to the engine continues.

Generally, a lock-up clutch may be engaged following a substantially immediate change from a first throttle position to a substantially greater second throttle position. Although the embodiment illustrated in FIGS. 2-5 includes a first throttle position that is a fully closed position, in other embodiments a first throttle position may be slightly open. In some cases, a throttle pedal may be depressed slightly so that a first throttle position is associated with a small throttle angle. In other cases, a driver may have cruise control activated. Motor vehicles in other driving situations may also benefit from controlling a throttle so that a lock-up clutch may be engaged.

Additionally, the method discussed in this detailed description is not limited to downshifting between a third gear and a second gear of a transmission. Generally, throttle control via drive-by-wire may be applied after any upshift or downshift.

Figure 6:
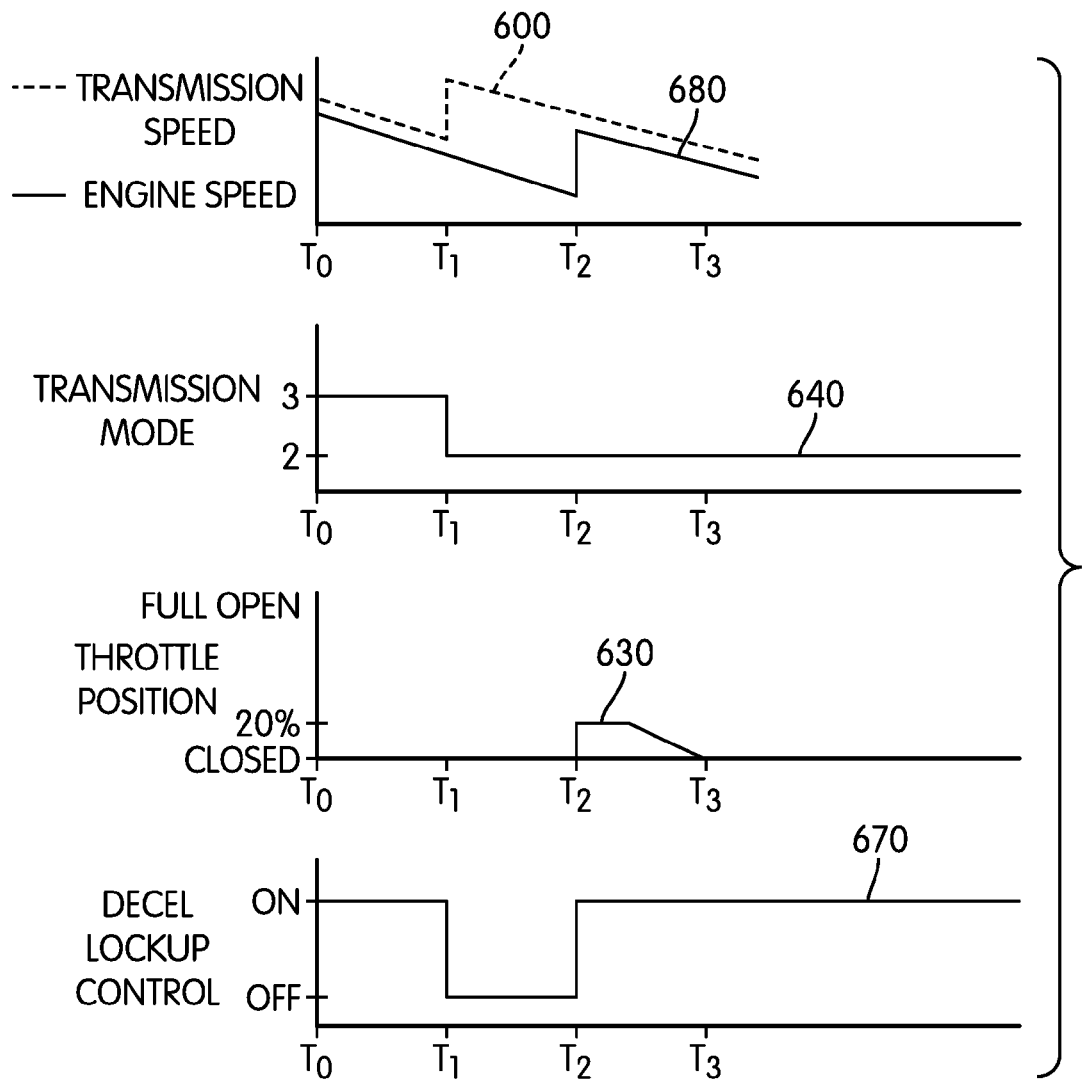
FIG. 6 is an embodiment of a relationship between engine speed, transmission speed, transmission mode, throttle position and fuel cut with a lock-up clutch engaged.

FIG. 6 illustrates an embodiment of a relationship between transmission speed, engine speed, transmission mode, throttle position and fuel cut as functions of time. It should be understood that the current embodiment is only intended to be exemplary. In other embodiments, the relationship between transmission speed, engine speed, transmission mode, throttle position and fuel cut could be varied.

The relationships discussed here may be associated with the scenario for motor vehicle 100 discussed in FIGS. 2-5. In other words, times between time T0 and time T1 may be associated with motor vehicle 100 when decel lock-up control is engaged in FIG. 2. Times between time T1 and time T2 may be associated with motor vehicle 100 when lock-up clutch 151 is disengaged as in FIG. 3. Time T2 may be associated with FIG. 4 when throttle 130 is opened and decel lock-up control is again engaged. Finally, time T3 and times after time T3 may be associated with motor vehicle 100 with decel lock-up control engaged and throttle 130 closed, as illustrated in FIG. 5.

In this embodiment, during times between time T0 and time T1, decel lock-up control is engaged in motor vehicle 100, as indicated by decel lock-up control line 670. In other words, lock-up clutch 151 is engaged and fuel injector set 170 is prevented from injecting fuel. In some embodiments, current transmission speed and engine speed, indicated by transmission speed curve 600 and engine speed curve 680, are closely aligned and, in this embodiment, decreasing. The transmission mode may be in third gear, as depicted by shift curve 640. Furthermore, throttle 130 is closed, as indicated by throttle position curve 630.

At time T1, shift curve 640 decreases to indicate a downshift and transmission mode 240 is now in second gear. As a consequence, transmission speed curve 600 increases to indicate an increase in current transmission speed. while engine speed curve 680 continues to decline, indicating a decrease in engine speed. As previously discussed, a downshift may require the inactivation of decel lock-up control to avoid a shock. Accordingly, decel lock-up control line 670 drops to an "off" position, as lock-up clutch 151 is disengaged and fuel injector set 170 resumes injecting fuel. Throttle position curve 630 remains at the same level, indicating that throttle 130 continues to be closed.

Between time T1 and T2, transmission speed curve 600 and engine speed curve 680 decline, but remain unaligned. In particular, transmission speed curve 600 indicates a higher current transmission speed than the engine speed indicated by engine speed curve 680. This difference between engine speed and current transmission speed may cause a shock, if lock-up clutch 151 is engaged at any time between time T1 and time T2. Therefore, decel lock-up control line 670 remains in the "off" position. Also, shift curve 640 continues to indicate a transmission mode of second gear and throttle position curve 630 remains at the closed position.

At time T2, however, throttle position curve 630 rises to indicate a throttle position of approximately 20%. This corresponds with the opening by drive-by-wire of throttle 130 to a second throttle position in FIG. 4. In an embodiment, this change in the throttle position occurs substantially instantaneously. In some embodiments, this change to a second throttle position causes the engine speed to increase to a required engine speed. By attaining the required engine speed, engine speed curve 680 increases to match the current transmission speed indicated by transmission speed curve 600. With this arrangement, decel lock-up control may be engaged without a shock. Accordingly, decel lock-up control line 670 increases to indicate the "on" position. Also, shift curve 640 continues to show a transmission mode of second gear.

For all times greater than time T2, lock-up clutch 151 continues to be engaged with a fuel cut activated as shown by decel lock-up control line 670. As a consequence, transmission speed curve 600 and engine speed curve 680 continue to be aligned while both curves 600 and 680 decrease slightly. Furthermore, throttle position curve 630 decreases from a required throttle position of approximately 20% at time T2 to reach a closed position at time T3. Also, shift curve 640 continues to indicate a transmission mode of second gear.

A lock-up clutch may be engaged and a fuel cut activated following an adjustment of the throttle to a second throttle position. Specifically, the second throttle position allows the engine speed to be increased to a required engine speed that matches a current transmission speed. With this arrangement, decel lock-up control may be engaged without a shock. After decel lock-up is engaged, the throttle may be ramped down to a fully closed position. It should be understood that decel lock-up control may be maintained as long as the throttle remains closed. In some cases, decel lock-up control may last only a short period of time, on the order of a few seconds. In other cases, decel lock-up control could last much longer.

Figure 7:
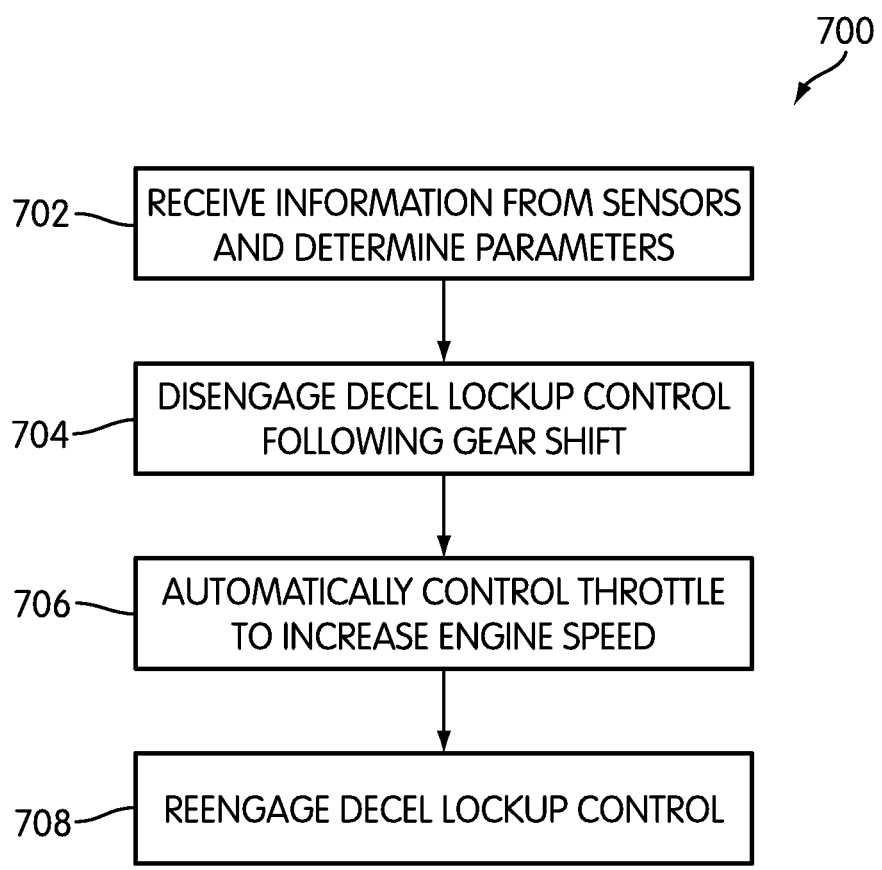
FIG. 7 is an embodiment of a process for controlling a throttle for fuel cut acquisition.

FIG. 7 is an embodiment of process 700 for operating motor vehicle 100, illustrated in FIG. 1 with other components, following the activation of decel lock-up control. In particular, the following method includes steps for controlling a throttle to increase an engine speed to a required engine speed so that decel lock-up control may be re-engaged after a gear shift. In this embodiment, the following steps may be performed by ECU 120; however in some embodiments these steps may be performed by additional systems or devices associated with motor vehicle 100 and engine 102.

During first step 702, ECU 120 receives information from sensors, including engine speed sensor 180 as well as other sensors. Also, ECU 120 may receive information from transmission 140 via fourth circuit 194, throttle 130 via fifth circuit 195 and throttle pedal 190 via sixth circuit 196. In an embodiment, ECU 120 may determine parameters including, but not limited to, engine speed, transmission speed, throttle angle and transmission mode at first step 702. In some embodiments, ECU 120 may determine shifting parameters. Generally, the term "shifting parameters", as used in this detailed description and throughout the claims, includes any set of parameters that are used as inputs to standard shift maps used by motor vehicles. In other embodiments, ECU 120 may receive information regarding other parameters as well.

Following first step 702, ECU 120 proceeds to second step 704. During second step 704, a gear shift occurs. In response to the gear shift, ECU 120 may deactivate decel lock-up control. In other words, ECU 120 disengages lock-up clutch 151 and resumes fuel injection during second step 704. Generally, the gear shift may have been an upshift or a downshift. As previously discussed, decel lock-up control may be deactivated during a gear shift to avoid a shock.

After second step 704, ECU 120 proceeds to third step 706. In some embodiments, a fuel cut may be resumed after a gear shift in order to extend fuel cut time and increase fuel economy. During third step 706, ECU 120 automatically controls throttle 130 to increase engine speed to a required engine speed. Specifically, ECU 120 selects a required throttle position to attain a required engine speed that corresponds with a current transmission speed to obtain zero torque engine conditions. The method for determining a required throttle position will be discussed later in this detailed description.

Following third step 706, ECU 120 proceeds to fourth step 708. During fourth step 708, ECU 120 reengages decel lock-up control. In other words, ECU 120 reengages lock-up clutch 151 and resumes a fuel cut. By increasing the engine speed to a required engine speed that corresponds to the current transmission speed, lock-up clutch 151 is able to engage without creating a shock to motor vehicle 100. With this arrangement, the fuel efficiency of motor vehicle 100 is increased.

Figure 8:
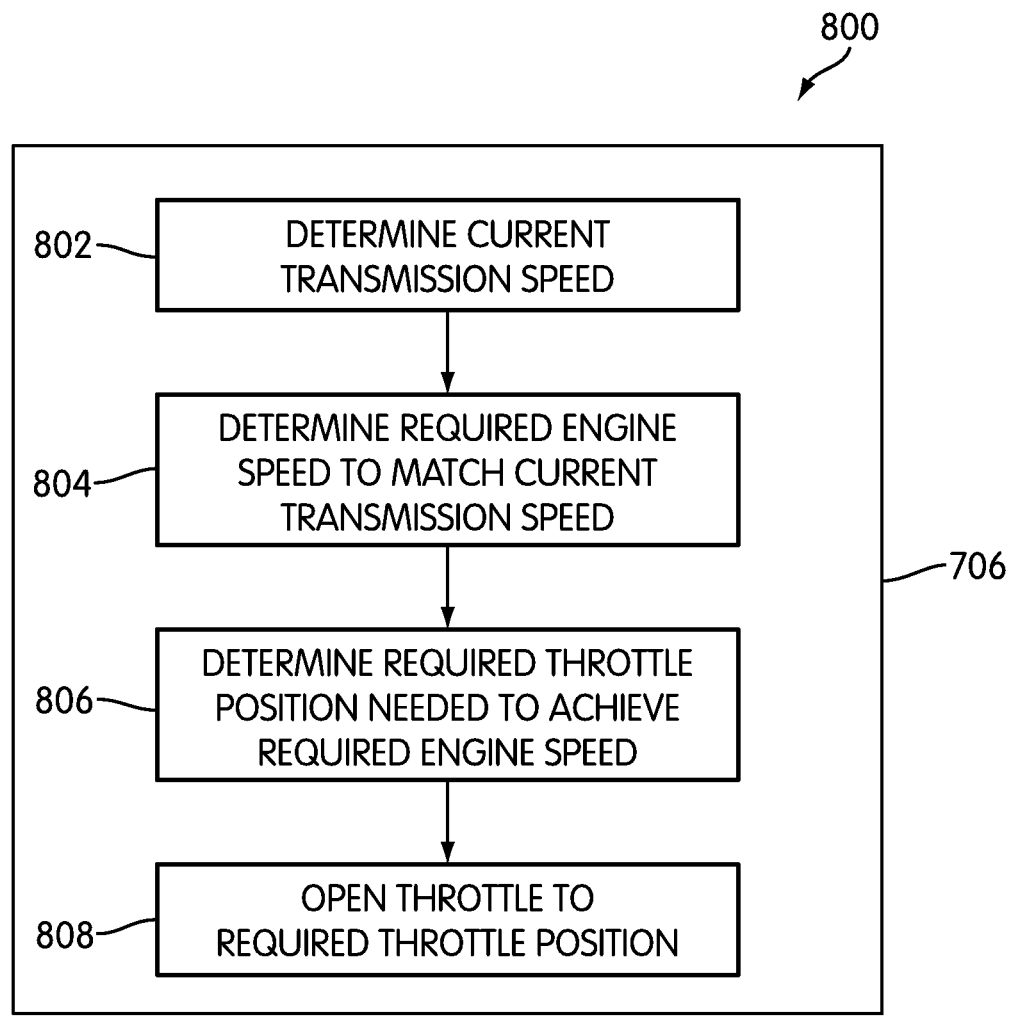
FIG. 8 is an embodiment of a process for determining a required throttle position value to reach a required engine speed.

FIG. 8 is an embodiment of detailed process 800 associated with third step 706 for motor vehicle 100, shown in FIG. 1 with components. In particular, these detailed steps may be used to determine a required throttle position that will increase engine 102, to a required engine speed so a lock-up clutch 151 may be engaged. The following steps may be performed by ECU 120, however in other embodiments some steps may be performed by other devices or systems associated with motor vehicle 100.

During first step 802, ECU 120 determines a current transmission speed of transmission 140. Generally, this may be determined in any known manner. Following first step 802, ECU 120 proceeds to second step 804. During second step 804, ECU 120 determines the required engine speed to match the current transmission speed.

After second step 804, ECU 120 proceeds to third step 806. During third step 806, ECU 120 determines a required throttle position that allows engine 102 to reach a required engine speed. Generally, the determination of a required throttle position may be achieved in any known manner. In an embodiment, ECU 120 may access a map similar to the embodiment in FIG. 9 to determine a required throttle position to reach a required engine speed.

Following third step 806, ECU 120 proceeds to fourth step 808. At fourth step 808, ECU 120 opens throttle 130 to the required throttle position. This arrangement allows ECU 120 to operate a throttle in the required throttle position to achieve the required engine speed and engage lockup clutch 151.

In some embodiments, an electronic control unit may include a map for determining a required throttle position necessary to achieve a required engine speed. The term "map" as used throughout this detailed description and in the claims refers to any relationship that associates a particular throttle position or range of throttle positions with a particular engine speed or range of engine speeds. In some cases, the map may be a mathematical relationship between engine speed and throttle position. In other words, the map may provide a function for determining the throttle position as a function of engine speed. In other cases, the map could be a look-up table. In other embodiments, the electronic control unit could use other provisions for determining a required throttle position needed to achieve a required engine speed.

FIG. 9 illustrates an exemplary embodiment of map 900. In some embodiments, map 900 includes throttle position curve 910 that describes a relationship between engine speeds 902 and throttle positions 904 for zero torque, or no-load, engine conditions. Generally, map 900 may be stored in memory accessible by an electronic control unit or some type of computer associated with a motor vehicle. In this exemplary embodiment, an electronic control unit may access map 900 to determine a required throttle position to reach a required engine speed.

Typically, a throttle position curve associating throttle positions with engine speeds may include assumptions on a load carried by a motor vehicle. In this exemplary embodiment, throttle position curve 910 indicates throttle positions 904 for associated engine speeds 902 for a motor vehicle under no-load conditions. It should be understood that map 900 is intended to be exemplary. In other embodiments, a throttle position curve may be configured in another manner. In other cases, a map with a throttle position curve may include additional inputs or variables.

In some embodiments, map 900 receives a required engine speed as an input and outputs a required throttle position. For example, if an electronic control unit determines a required engine speed of 3000 RPM according to a current transmission speed then the electronic control unit will access map 900 and input a required engine speed of 3000 RPM. In this embodiment, map 900 will output a required throttle position of 10% with an input of 3000 RPM. In some embodiments, the electronic control unit then opens a throttle to the required throttle position of 10%. Using this configuration, an electronic control unit may achieve the required engine speed and engage a lock-up clutch to increase fuel economy.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

I claim:

1. A method of operating a motor vehicle, comprising the steps of:
    receiving a current transmission speed;
    determining a required engine speed, the required engine speed being an engine speed that matches the current transmission speed;
    determining a required throttle position, the required throttle position being a throttle position that causes the engine speed to be the required engine speed;
    opening a throttle to the required throttle position, thereby causing the engine speed to be the required engine speed; and
    engaging a lock-up clutch.

2. The method according to claim 1, wherein the step of determining the required throttle position includes a step of retrieving a map of multiple throttle positions that each correlate with different engine speeds.

3. The method according to claim 2, wherein the map is a mathematical relationship.

4. The method according to claim 3, wherein the map is a lookup table.

5. The method according to claim 1, wherein the throttle is opened to the required throttle position substantially immediately.

6. The method according to claim 1, wherein the step of engaging the lock-up clutch is followed by a step of reengaging a fuel cut.

7. The method according to claim 1, wherein the current transmission speed is received from a sensor configured to determine transmission speed.

8. The method according to claim 1, wherein the throttle is opened using a drive-by-wire system.

9. A method of operating a motor vehicle, comprising the steps of:
    determining a relationship between throttle position and engine speed for an engine experiencing a predetermined level of torque;
    creating a map that receives an engine speed as an input and outputs a throttle position; and
    using an electronic control unit of the motor vehicle to access the map and compute a required throttle position, the required throttle position being a throttle position that causes the engine speed to be an engine speed that matches the transmission speed.

10. The method of according to claim 9, wherein the map is a mathematical relationship.

11. The method according to claim 9, wherein the map is a lookup table.

12. The method according to claim 9, wherein the relationship between throttle position and engine speed is determined for an engine experiencing zero torque.

13. A method of operating a motor vehicle, comprising the steps of:
    operating a throttle in a first throttle position while a lock-up clutch is disengaged and the transmission speed is greater than zero;
    determining a second throttle position that is substantially greater than the first throttle position, the second throttle position being a throttle position that causes an engine speed to match a transmission speed;
    changing the throttle from the first throttle position to the second throttle position, the change occurring substantially immediately; and
    engaging the lock-up clutch while the throttle is in the second throttle position.

14. The method according to claim 13, wherein the step of engaging the lock-up clutch while the throttle is in the second throttle position occurs while the engine torque is zero.

15. The method according to claim 13, wherein the step of determining the second throttle position includes a step of determining a required engine speed, the required engine speed being an engine speed that matches the current transmission speed.

16. The method according to claim 13, wherein the step of engaging the lock-up clutch is followed by a step of engaging a fuel cut.

17. The method according to claim 16, wherein the step of engaging the lock-up clutch is followed by a step of closing the throttle in addition to the step of engaging a fuel cut.

18. The method according to claim 13, wherein the throttle is controlled independently of a throttle pedal.

19. The method according to claim 13, wherein the step of operating a throttle in a first position follows an upshift.

20. The method according to claim 13, wherein the step of operating a throttle in a first position follows a downshift.

* * * * *